(12) United States Patent
Ahmad

(10) Patent No.: US 6,928,817 B2
(45) Date of Patent: Aug. 16, 2005

(54) CONTROL SYSTEM FOR IMPROVED TRANSIENT RESPONSE IN A VARIABLE-GEOMETRY TURBOCHARGER

(75) Inventor: Samir S. Ahmad, Rancho Palos Verdes, CA (US)

(73) Assignee: Honeywell International, Inc., Morristown, NJ (US)

( * ) Notice: Subject to any disclaimer, the term of this patent is extended or adjusted under 35 U.S.C. 154(b) by 0 days.

(21) Appl. No.: 10/606,003

(22) Filed: Jun. 24, 2003

(65) Prior Publication Data

US 2004/0000143 A1 Jan. 1, 2004

Related U.S. Application Data

(60) Provisional application No. 60/392,923, filed on Jun. 28, 2002.

(51) Int. Cl.[7] .......................... F02D 23/00; F02D 33/02
(52) U.S. Cl. ......................................... 60/602; 60/600
(58) Field of Search ............. 60/600–603; F02D 33/02

(56) References Cited

U.S. PATENT DOCUMENTS

| | | | |
|---|---|---|---|
| 4,597,265 A | * | 7/1986 | Buck et al. ................... 60/602 |
| 4,685,302 A | | 8/1987 | Sumizawa et al. ............ 60/602 |
| 5,121,604 A | | 6/1992 | Berger et al. ................ 360/602 |
| 5,123,246 A | | 6/1992 | Rini et al. ..................... 60/602 |
| 5,680,763 A | | 10/1997 | Torne et al. .................... 60/602 |
| 5,782,092 A | * | 7/1998 | Schultalbers et al. ......... 60/602 |
| 6,058,707 A | | 5/2000 | Bischoff ....................... 60/602 |
| 6,067,798 A | | 5/2000 | Okada et al. ................. 60/602 |
| 6,067,799 A | | 5/2000 | Heinitz et al. ................ 60/602 |
| 6,089,018 A | | 7/2000 | Bischoff et al. .............. 60/602 |
| 6,134,890 A | | 10/2000 | Church et al. ................ 60/602 |
| 6,233,934 B1 | | 5/2001 | Church et al. ................ 60/602 |
| 6,272,859 B1 | | 8/2001 | Barnes et al. ................. 60/602 |
| 6,510,691 B1 | * | 1/2003 | Schmid ........................ 60/602 |
| 6,681,573 B2 | * | 1/2004 | Arnold ......................... 60/602 |
| 6,718,767 B1 | * | 4/2004 | Caddy .......................... 60/602 |

FOREIGN PATENT DOCUMENTS

| | | | |
|---|---|---|---|
| EP | 0533321 A1 | 6/1994 | |
| EP | 0786589 A1 | 7/1997 | .................. 60/602 |
| EP | 0 786 589 | 7/1997 | .................. 60/602 |
| EP | 0992663 A2 | 4/2000 | |
| EP | 1024259 A2 | 8/2000 | |
| EP | 1081353 A1 | 3/2001 | |
| EP | 1225320 A1 | 7/2002 | .................. 60/602 |
| GB | 2304823 A | 6/1996 | |
| GB | 2331596 A | 11/1998 | .................. 60/602 |
| JP | 03105022 | 5/1991 | |
| WO | WO-9745633 | 12/1997 | |
| WO | WO-9923377 | 5/1999 | .................. 60/602 |
| WO | WO-0020746 | 4/2000 | .................. 60/602 |
| WO | WO-0155575 A1 | 8/2001 | .................. 60/602 |
| WO | WO-0159275 A2 | 8/2001 | .................. 60/602 |
| WO | WO-0166921 A1 | 9/2001 | .................. 60/602 |
| WO | WO-0229228 A1 | 4/2002 | .................. 60/602 |
| WO | WO-0229229 A1 | 4/2002 | .................. 60/602 |
| WO | WO-0229230 A1 | 4/2002 | .................. 60/602 |

* cited by examiner

Primary Examiner—Thai-Ba Trieu
(74) Attorney, Agent, or Firm—John C. James; Ephraim Starr

(57) ABSTRACT

A control system for a variable-geometry turbocharger includes a supervisor logic (12) selecting a pulse control output (24) for large variation of desired and previous control signal inputs exceeding a threshold differential and a normal control signal (26) for small control signal input changes. The control system calculates an amplitude and duration for the pulse control output based on input control signal variation or the actual versus desired position of the variable-geometry system in the turbocharger.

26 Claims, 9 Drawing Sheets

//* CONTROL SYSTEM FOR IMPROVED TRANSIENT RESPONSE IN A VARIABLE-GEOMETRY TURBOCHARGER

CROSS-REFERENCE TO RELATED APPLICATION

This application claims the benefit of U.S. Provisional Patent Application Ser. No. 60/392,923 filed Jun. 28, 2002, which is incorporated by reference herein.

FIELD OF THE INVENTION

This invention relates generally to the field of turbocharger control systems and, more particularly, to a system and method for improving transient response times of a variable-geometry turbocharger.

BACKGROUND OF THE INVENTION

Turbochargers are required to operate over a wide range of engine speeds and loads. Systems have been developed to precisely control the boost provided by the turbocharger by controlling the exhaust gas provided to the turbine of the turbocharger. In general, a control mechanism for controlling the amount of boost provided by a turbocharger includes some type of variable-geometry mechanism that effectively varies the geometry of the turbine inlet nozzle. Such mechanisms can include, for example, multiple movable aerodynamic vanes in the nozzle, or pistons with or without vanes comprising one wall of the nozzle which are axially movable with respect to a fixed nozzle wall. Control of these mechanisms varies depending on application and can include pneumatic, electromechanical, hydraulic, and electrohydraulic actuation systems. Control of the actuation system can be open-loop or closed-loop or a combination of open- and closed-loop.

The control of a turbocharger is complicated by the inherent lag in the engine exhaust system and the transient response times of the mechanical elements of the variable-geometry mechanism.

A variable-geometry turbocharger (VGT) such as that disclosed in U.S. Pat. No. 6,269,642 uses vanes to guide the airflow in the turbine nozzle and to adjust the flow area of the nozzle to reduce turbo-lag and improve the acceleration of the engine. The VGT employs an electro-hydraulic actuation system that uses an electrical control signal to activate a spool valve that controls the flow of engine oil into and out of an actuator piston cylinder. The actuator force produced for rotating the vanes is proportional to the pressure differential across the actuator piston cylinder. The dynamic response of the vanes is a function of the oil flow and oil pressure and will vary according to the operating conditions such as supply pressure, hydraulic fluid temperature, ambient temperature and valve loading, among other parameters. These effects are sufficient to slow the dynamic response of the turbocharger vanes. Many different methods are used to attain a faster dynamic response. Internal valve parameters (e.g., nozzle and orifice sizes, spring rate, spool diameter, spool displacements, etc.) may be adjusted to produce a faster response. These changes require additional design, testing, and cost for varying application requirements.

Similar control issues arise with wastegates and other variable-geometry devices in turbocharger applications.

It is therefore desirable to have a control system that improves the dynamic response of the variable-geometry mechanism in a turbocharger.

It is also desirable to have a control system that is applicable to existing variable-geometry mechanisms without modification of the existing components.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 8:
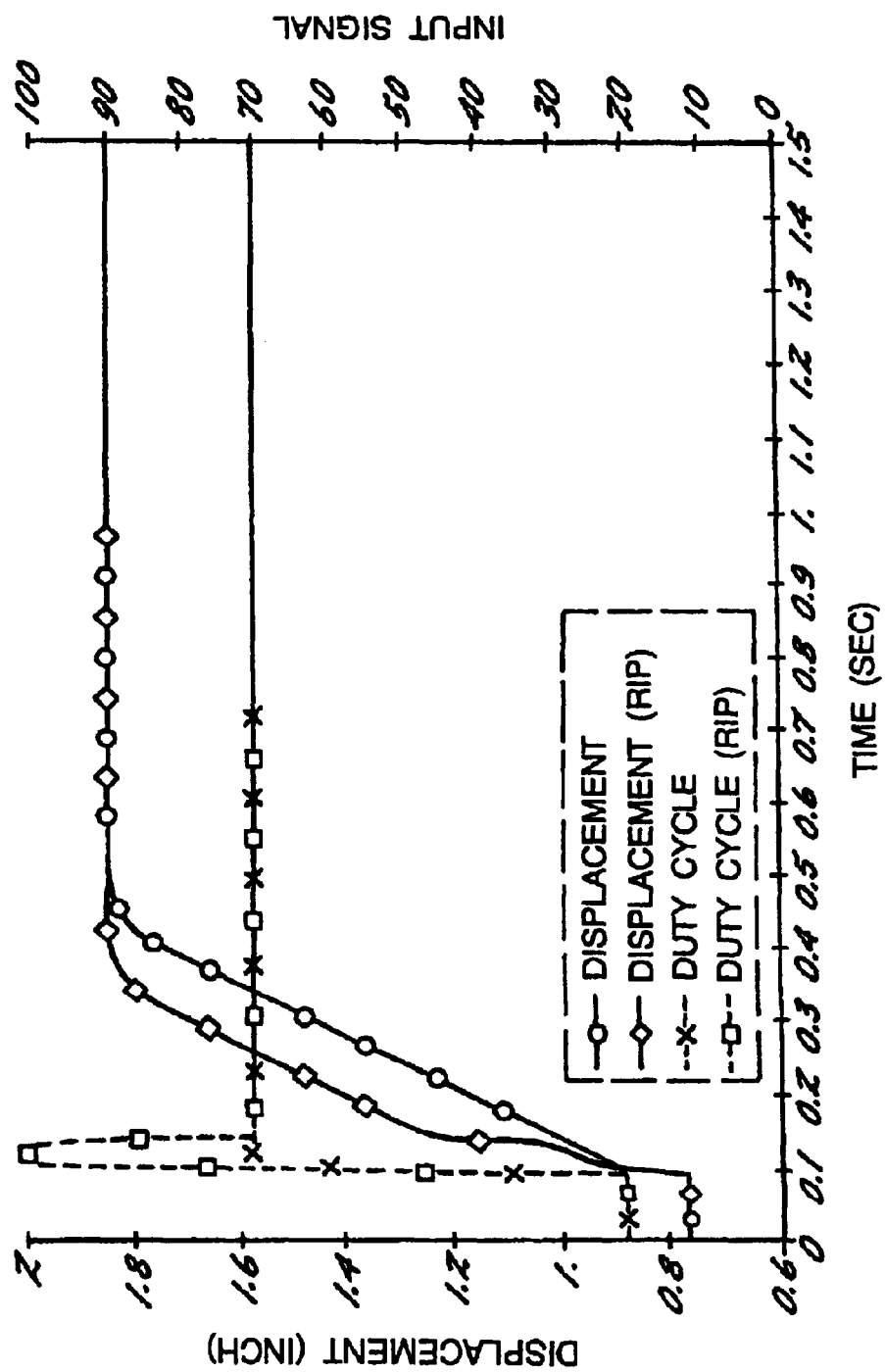
Figure 9:
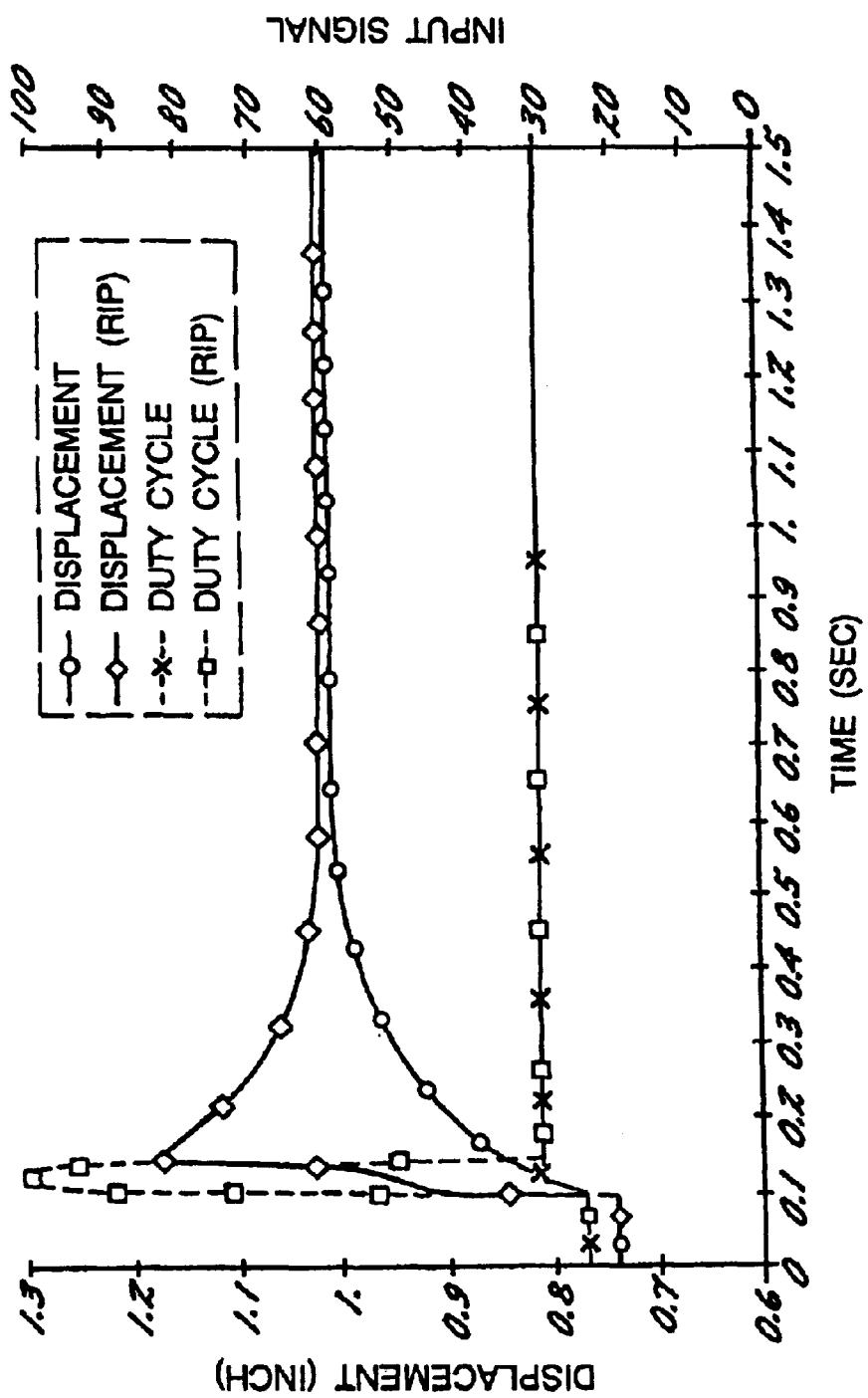

FIG. 8 is a plot of control signal and the resulting actuator displacement produced in a variable-geometry turbocharger as a function of time, for a full range of travel of the actuator, for both a normal control signal as well as a pulsed control signal in accordance with the invention; and FIG. 9 is a plot of control signal and the resulting actuator displacement produced in a variable-geometry turbocharger as a function of time, for a small range of travel of the actuator, for both a normal control signal as well as a pulsed control signal in accordance with the invention.

DETAILED DESCRIPTION OF THE INVENTION

The present inventions now will be described more fully hereinafter with reference to the accompanying drawings, in which some, but not all embodiments of the invention are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

The inventive control system includes a supervisor logic that monitors the change in the control signal that is provided for adjusting the variable-geometry mechanism. The supervisor logic selects between a normal control signal output and a rapid pulse response control signal output to adjust the variable-geometry mechanism. For large changes in the control signal above a predetermined threshold value, the supervisor logic selects the rapid pulse response control output providing a pulse of calculated amplitude and duration to initiate movement of the variable geometry nozzle. The pulse can comprise a virtual step change in the control signal to a value exceeding that of the normal control signal that would ordinarily be applied in the absence of the supervisor logic. The amplitude of the pulse is determined as a function of a difference parameter. The difference parameter can be the difference between a desired (i.e., normal) control signal value and a previous control signal value determined in a previous iteration of the control logic;

alternatively, the difference parameter can be the difference between the desired control signal and an actual (measured or estimated) control signal. Whenever the change in the control signal is below the predetermined threshold, the supervisor logic supplies the normal control signal to adjust the variable-geometry mechanism.

The amplitude (or height) and the duration (or width) of the pulse can also be a function of ambient conditions in some embodiments of the invention. This can be advantageous, for example, to account for cold ambient temperature conditions and adjust the response of the valve accordingly.

One embodiment of the present invention is applicable for use on a variable nozzle turbocharger such as that defined in the previously referenced U.S. Pat. No. 6,269,642 entitled VARIABLE GEOMETRY TURBOCHARGER having a common assignee with the present application, the disclosure of which is incorporated by reference herein.

Figure 1:
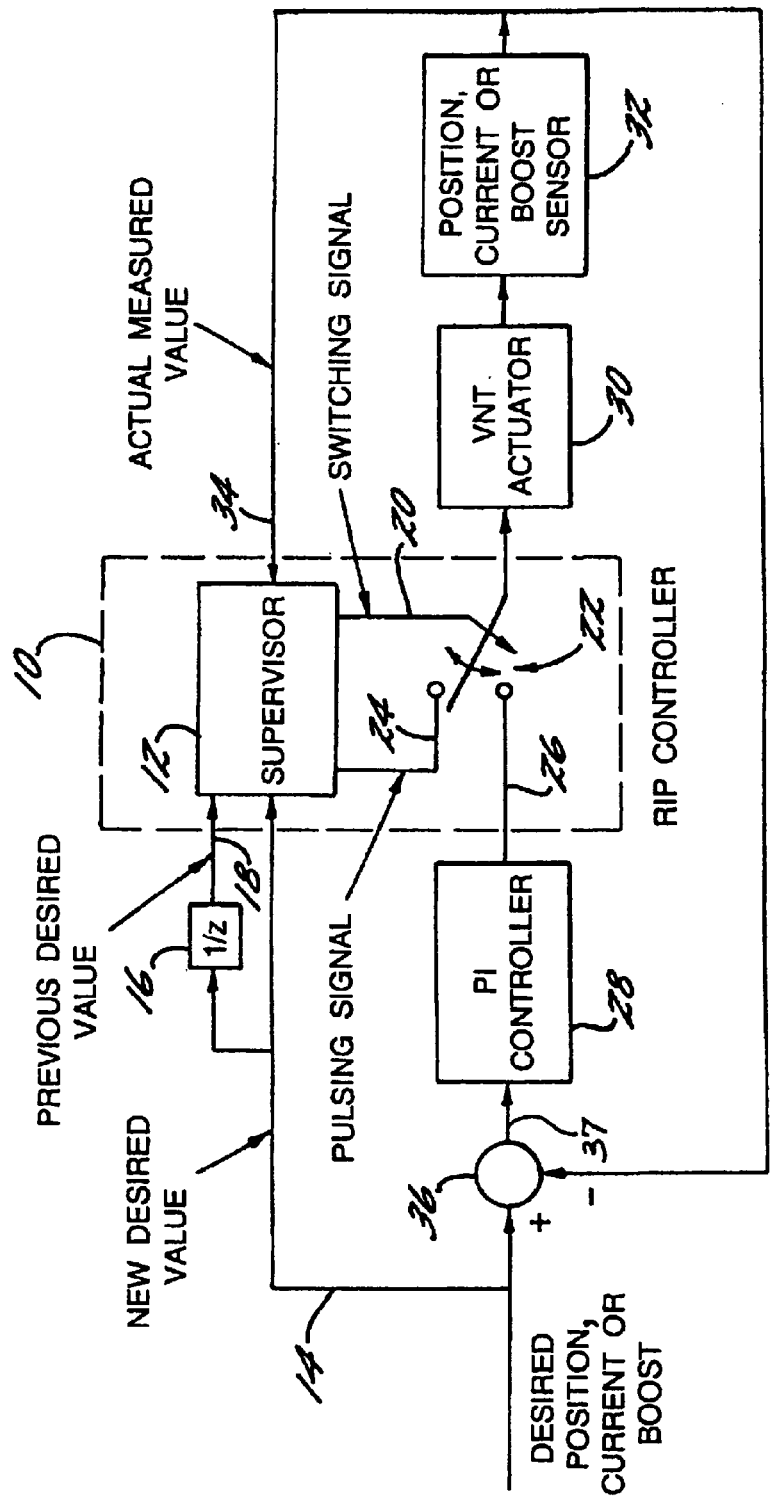
FIG. 1 is a schematic diagram of an embodiment of a control system employing the present invention for a closed-loop system.

Referring to the drawings, a first embodiment of a control system in accordance with the present invention is shown in FIG. 1. A Rapid Improvement Pulse (RIP) controller 10 incorporates a supervisor logic circuit or arrangement 12 that receives an input 14 from the engine system representing a desired control value. The desired control value is established in various applications as a position of the VGT mechanical system, a desired boost level or an electrical control current. A memory 16 stores the previous desired control value for the previous sample period. The memory in alternative embodiments incorporates a filtering function for conditioning of the stored control value. The previous control value is provided as a second input 18 to the supervisor logic. The input signals are analyzed, as described in greater detail below, and a switch selection signal 20 is provided to a switch 22 for selection of either a pulse control signal 24 or a normal control signal 26 determined by a VGT position controller 28. The selected control signal is provided to the actuator 30 for adjusting the variable-nozzle vane position. For the closed-loop control system in the embodiment of FIG. 1, a sensor 32 or model-based estimator detects or estimates an actual operating condition of the turbocharger, such as current, variable-geometry member position, or boost, and provides a feedback signal representing the actual measured or estimated value to a third input 34 of the supervisor logic as well as to a feedback summer 36 for the feedback controller, which computes an error signal 37 that is input to the VGT position controller 28.

Figure 2:
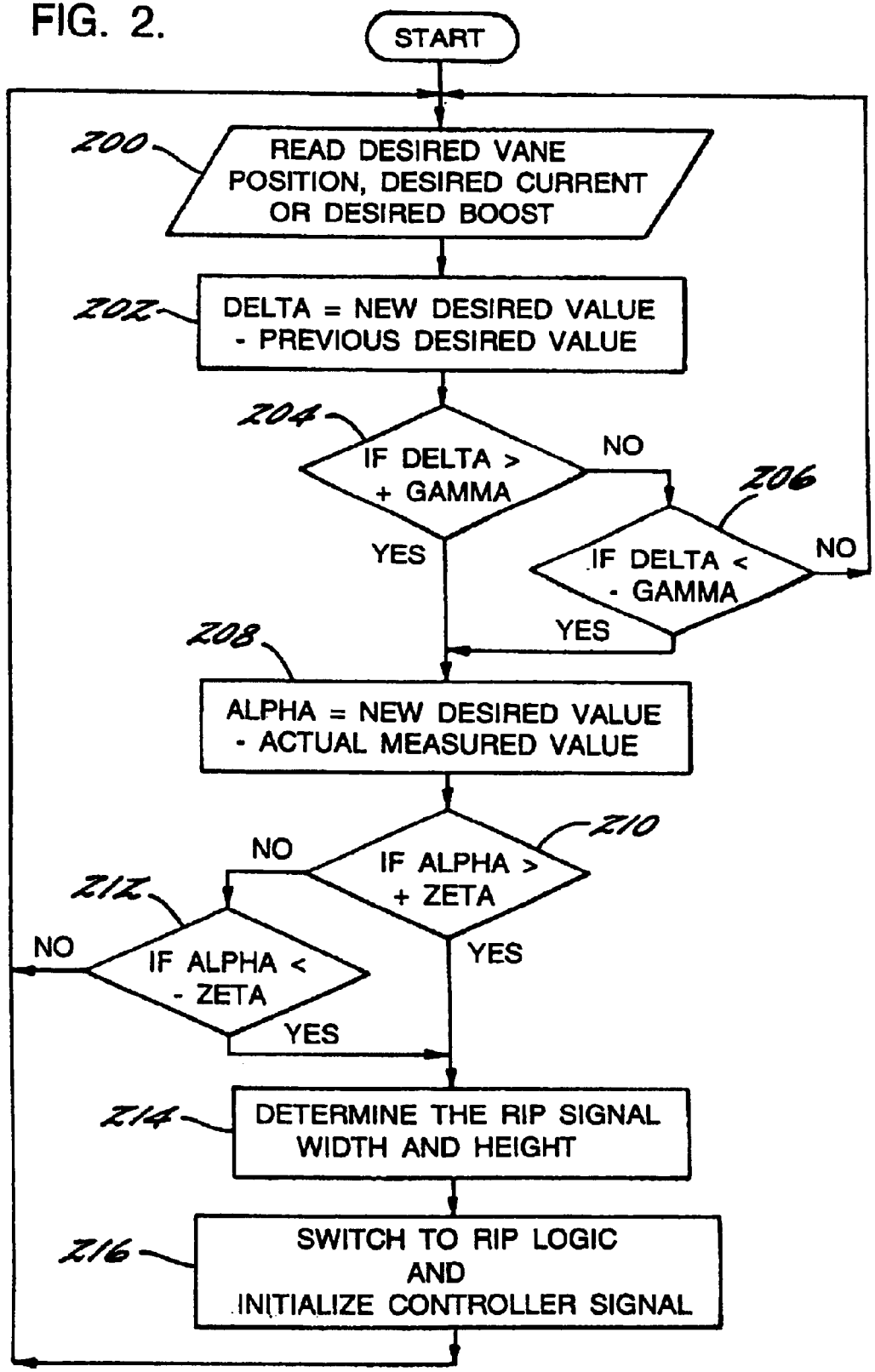
FIG. 2 is a flow chart for the closed-loop control logic employed by the embodiment of the invention in FIG. 1.

The logic employed in the RIP controller of FIG. 1 is shown in FIG. 2. For each sample period, the supervisor logic 12 reads the desired control value in step 200. As previously discussed, this value can be a desired variable-geometry member position, desired control current, or a desired boost value depending on the logic and circuitry employed. The supervisor logic in step 202 calculates a first parameter, Delta, as the difference between the new desired control value and the previous desired value (stored in memory 16). A predetermined threshold value, Gamma (which is a positive number), is compared to Delta in step 204 and if Delta is not greater than +Gamma a determination is made in step 206 whether Delta is less than −Gamma. If either step 204 or step 206 produces an affirmative result, the supervisor logic in step 208 determines a second parameter, Alpha, as the new desired control value minus the actual measured (or estimated) value. In step 210 the supervisor logic tests whether Alpha is greater than +Zeta (a second predetermined threshold); if it is not, then in step 212 the logic tests whether Alpha is less than −Zeta. If either step 210 or step 212 produces an affirmative result, then the supervisor logic determines in step 214 a value for the RIP pulse amplitude and duration (also referred to respectively as the signal height and width). In step 216 the RIP pulse control signal 24 is provided to the switch 22, which is positioned to provide the pulse signal to the actuator 30. At the termination of the pulse, or in any sample period in which the first and second parameters, Delta and Alpha, do not exceed the threshold values Gamma and Zeta, respectively, the switch 22 is positioned to the normal controller input 26. For example, if step 206 results in a negative result (meaning Delta is not less than −Gamma), the logic returns to step 200, such that in that sample period the control signal supplied by the switch would be the normal control signal 26. Similarly, if step 212 results in a negative result (meaning Alpha is not less than −Zeta), then the logic returns to step 200.

Figure 3:
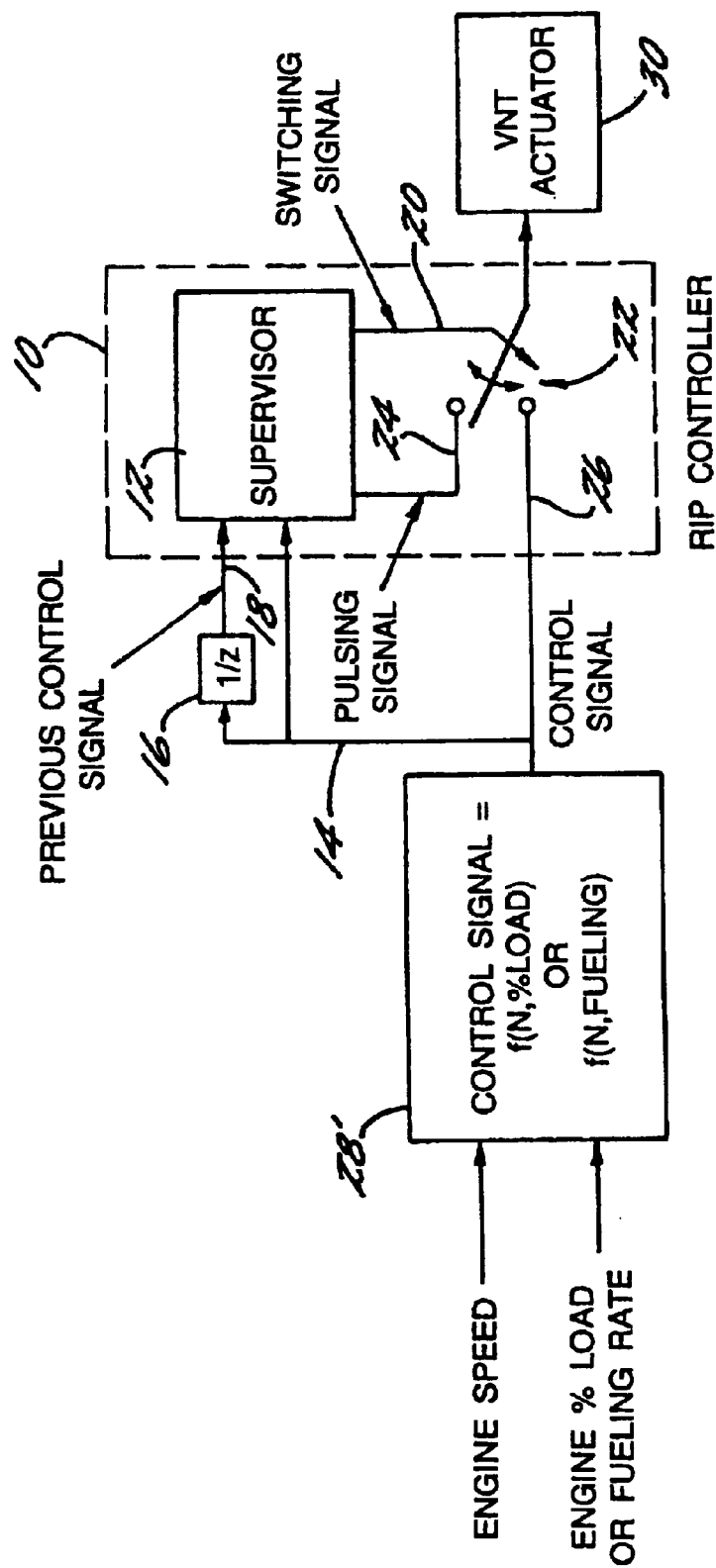
FIG. 3 is a schematic diagram of an embodiment of a control system employing the present invention for an open-loop system.
Figure 4:
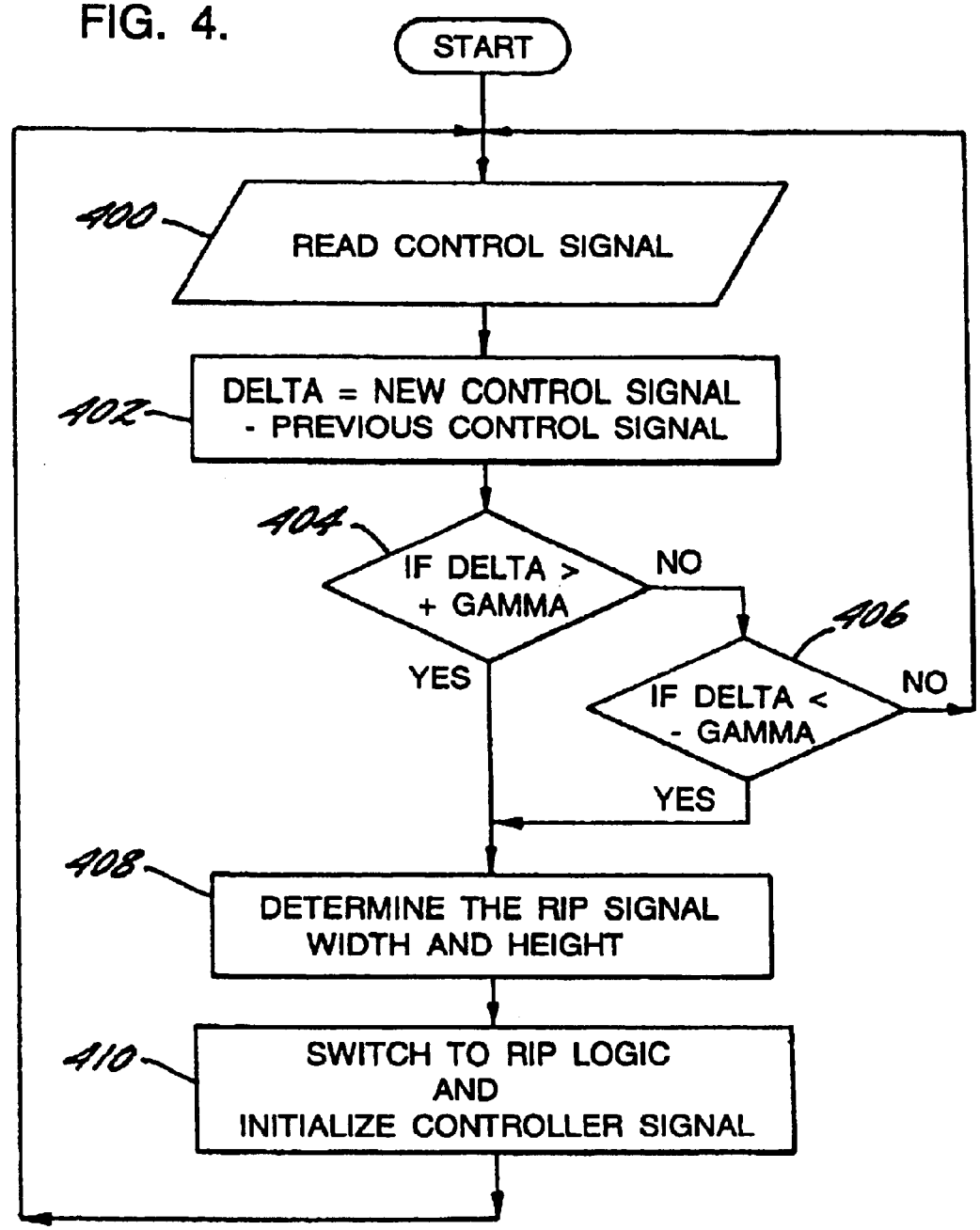
FIG. 4 is a flow chart for the open-loop control logic employed by the embodiment of the invention in FIG. 3.

An embodiment of a control system employing the present invention in an open-loop system is shown in FIG. 3. In most open-loop systems, the control input for the turbocharger is defined in terms of a function of engine speed (N) and either percentage of engine load or fuel flow rate as variables in a look-up table or other transfer function generator, represented generally as element 28'. The elements of the RIP Controller including the supervisor logic 12, previous control signal memory 16, and switch 22 operate as previously described in connection with FIG. 1. The logic employed by the open-loop RIP controller is shown in FIG. 4.

For each sample period, the supervisor logic reads the control signal in step 400. As previously discussed, this value can be a function of engine speed and percent load or fueling rate. The supervisor logic in step 402 calculates a control parameter, Delta, as the difference between the new control signal and the previous control signal. A predetermined threshold value, Gamma, is compared in step 404 and if Delta is not greater than +Gamma a determination is made in step 406 if Delta is less than −Gamma. If either is true, the supervisor logic in step 408 determines a value for the RIP pulse amplitude (or height) and duration (or width). The switch 22 is positioned to the pulse input and the pulse signal is provided to the actuator 30. At the termination of the pulse, or in any sample period in which the parameter, Delta, does not exceed the threshold value, Gamma, the switch 22 is positioned to the normal control input 26.

The logic identified in the embodiments shown can be implemented in various computational, hardware or firmware forms with a microprocessor, programmable logic array (PLA), fuzzy logic, neural network, or other discrete logic.

Figure 5:
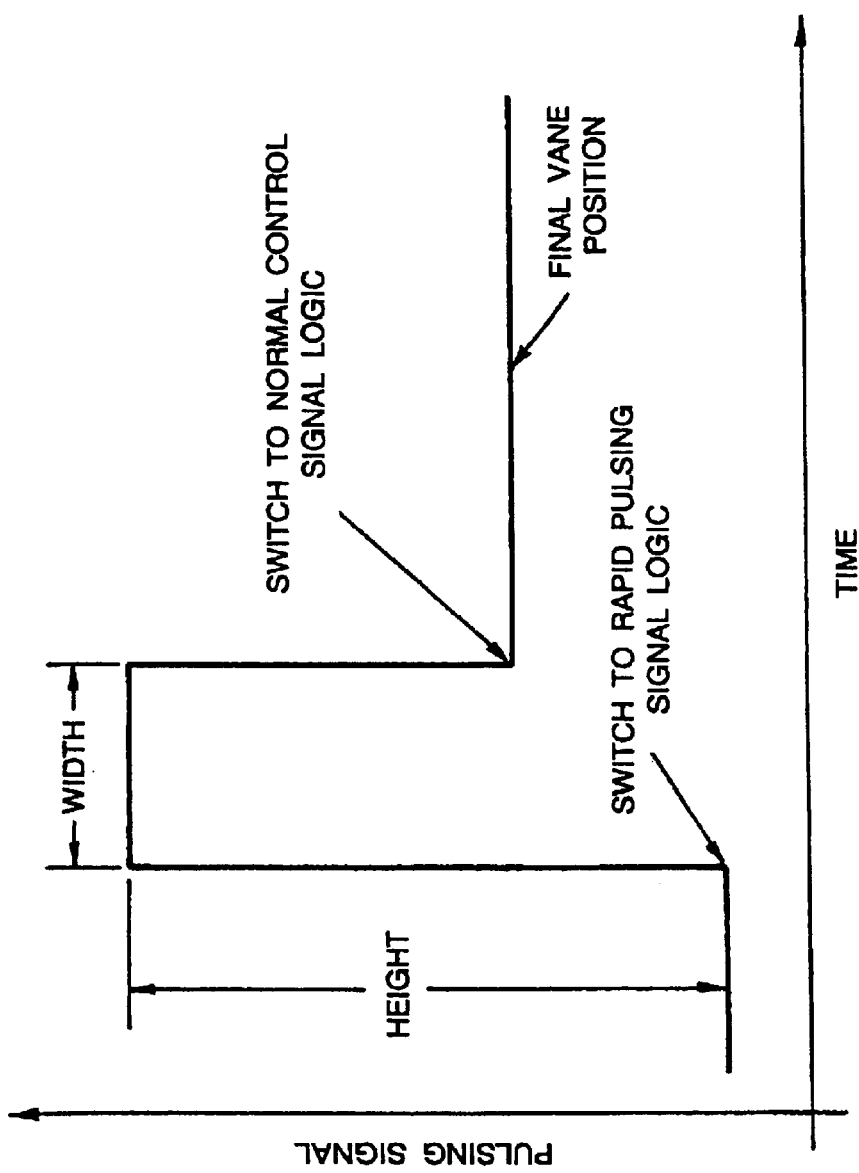
FIG. 5 is a diagram of the time varying pulse created by a control system employing the present invention for a positive differential value.
Figure 6:
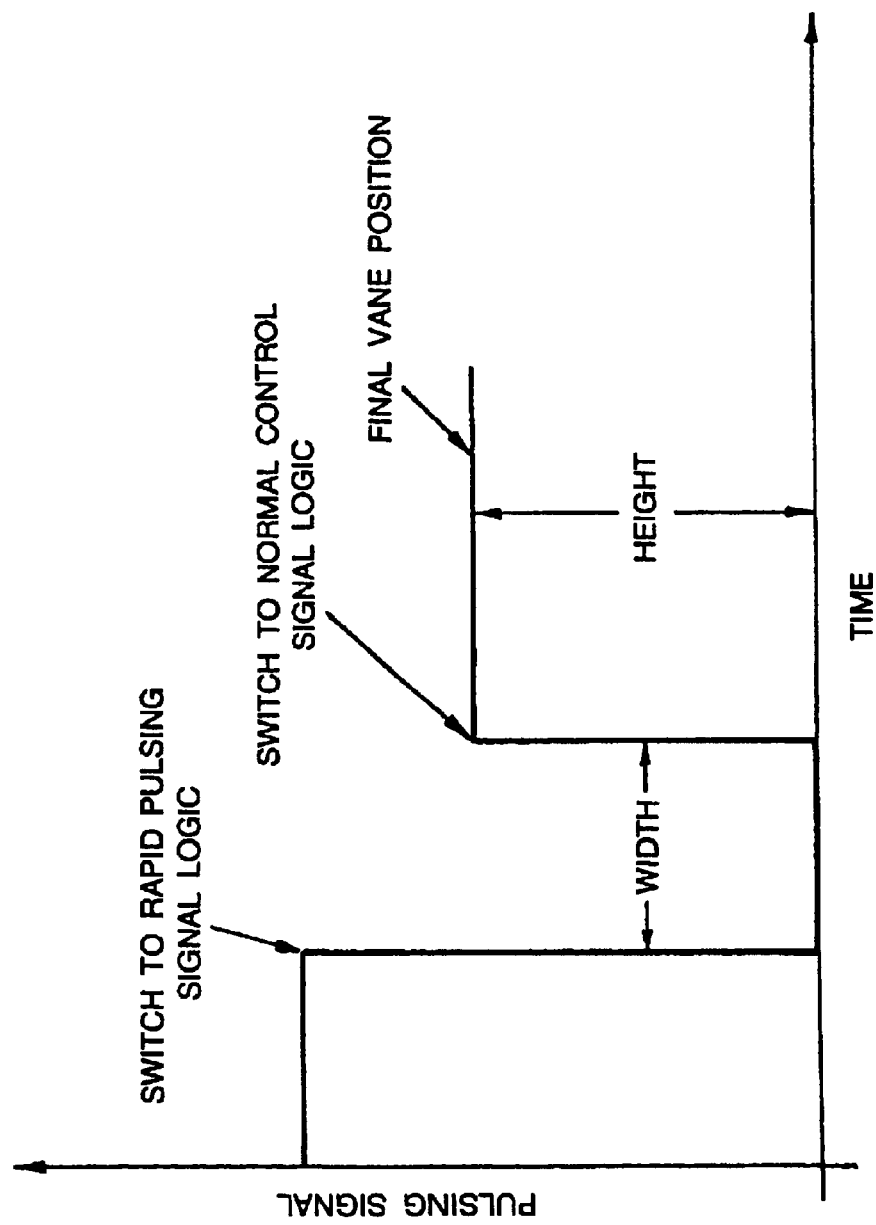
FIG. 6 is a diagram of the time varying pulse created by a control system employing the present invention for a negative differential value.
Figure 7:
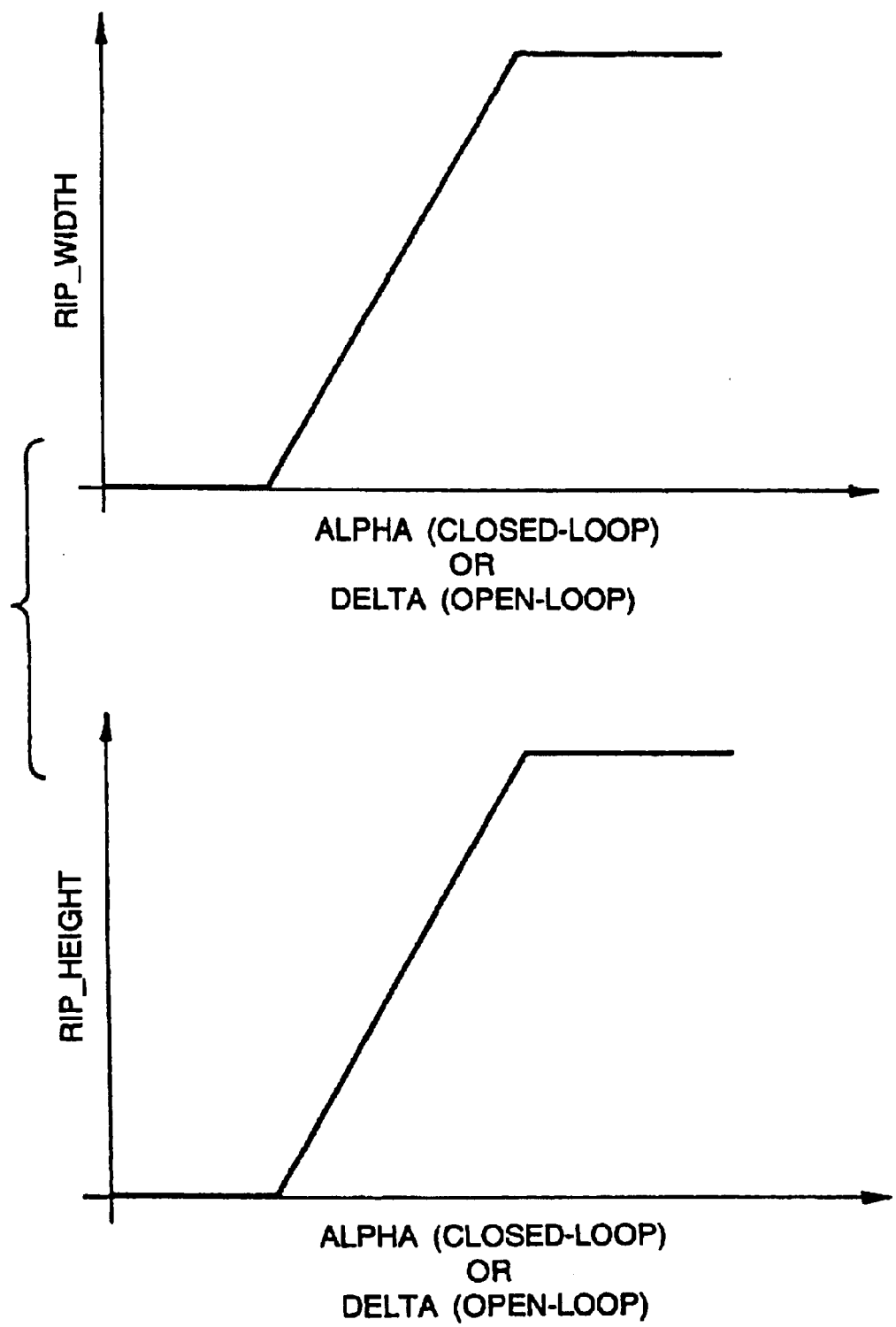
FIG. 7 is a graphical representation of the amplitude and duration values for the pulses of FIGS. 5 and 6 calculated by the control system.

An example of a pulse output provided by the RIP controller is shown in FIG. 5 for a positive pulse resulting from a positive Delta value exceeding the +Gamma threshold. FIG. 6 demonstrates a pulse for a negative Delta value exceeding the −Gamma threshold. The height and width of the pulse in each case are determined in the supervisor logic as a function of the Delta parameter for an open-loop system or the Alpha parameter for a closed-loop system. For example, FIG. 7 shows pulse width and pulse height each as a linear function of either Alpha or Delta (depending on whether the system is closed-loop or open-loop, respectively). Implementation of the pulse generation function in the controller can be effected by a table look-up using tables stored in a memory; alternatively, the pulse generation can be effected by calculating the pulse characteristics based on equations or transfer functions to achieve the desired initiation impulse to the vane control system.

The pulse duration or width can be also determined as a function of the error 37 between the desired and measured or estimated control value as shown in FIG. 1.

An RIP controller in accordance with the invention was implemented in a turbocharger system generally similar to that shown in the previously referenced U.S. Pat. No. 6,269,642. The control system for the turbocharger employed closed-loop control for controlling the position of variable vanes in the turbine inlet nozzle. FIG. 8 shows the improved response in control vane displacement for a full range displacement (fully closed to fully open) with the use of an RIP controller of the present invention as compared to a normal input control. The pulse generated by the RIP controller is designated with "□" symbols while the normal control signal output is designated with "x" symbols. The resulting vane displacement as a function of time is shown on the curve designated with "◊" symbols for the RIP pulsed input signal; the curve designated with "o" symbols shows the vane displacement achieved using the normal control input signal. The resulting reduction in the transient response time of the vanes is significant.

FIG. 9 is a plot of the same type as FIG. 8, but showing the control signals and transient response of the turbocharger vanes for a small range of vane displacement. It will be noted that there is some overshoot in the response of the displacement. The amount of the overshoot can be controlled by selection of the amplitude and duration of the pulsed control signal. Overshoot can be advantageous in that it can speed the response of the boost pressure, which tends to lag with respect to the vane position. Thus, by intentionally overshooting on vane displacement, the boost pressure can be made to more quickly reach the desired level.

The reduction in transient response time is achieved because the RIP pulsed input signal for a short period of time substantially overshoots the level corresponding to the actual desired position of the variable-geometry vanes. As a result, for that short period of time the actuator is caused to move, essentially at its maximum possible speed, toward the position corresponding to the magnitude of the RIP pulsed signal. In this way, the vanes reach the actual desired position sooner than they would if a normal input signal were supplied to the actuator. In the case of a normal control signal, the actuator is caused to move at less than its maximum possible speed and the speed is substantially constant over the entire period of time that it takes for the vanes to reach the desired position.

The inventive control system is applicable to wastegate control systems and other variable geometry configurations in turbocharger applications.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method for controlling a variable-geometry mechanism in a turbocharger for an engine, comprising the steps of:

sampling a desired control value representing a desired operating condition in which the turbocharger is to be operated;

sampling a previous desired control value representing the desired control value determined in a previous sample period;

determining a first difference parameter as the difference between the desired control value and the previous desired control value; and supplying a control signal output to an actuator for the variable-geometry mechanism based on said first difference parameter, such that the control signal output has a first value when said first difference parameter is greater than a predetermined first threshold and has a second value different from the first value when said first difference parameter is not greater than the predetermined first threshold, said first value being supplied in the form of a pulse of predetermined amplitude and duration.

2. The method of claim 1, wherein the amplitude and duration of the pulse are functions of ambient conditions.

3. The method of claim 1, wherein the amplitude and duration of the pulse are determined as a function of said first difference parameter.

4. The method of claim 1, further comprising the step of causing the control signal output to have the second value upon expiration of the duration of the pulse.

5. The method of claim 1, wherein the second value is determined as a function of engine speed and degree of loading on the engine.

6. The method of claim 1, wherein the second value is determined as a function of engine speed and fueling rate of the engine.

7. The method of claim 1, wherein the second value is determined based on a feedback signal.

8. The method of claim 1, further comprising the steps of:

sampling an actual control value representing an actual operating condition of the turbocharger;

determining a second difference parameter as the difference between the desired control value and the actual control value; and producing the control signal output at the first value when either the first difference parameter is greater than the first threshold or the second difference parameter is greater than the second threshold.

9. The method of claim 1, further comprising the step of storing the previous desired control value in a memory.

10. The method of claim 9, further comprising the step of filtering the stored previous desired control value.

11. A control system for a variable-geometry turbocharger, comprising:

a logic circuit having a first input, a second input, and an output, the logic circuit being structured and arranged to calculate a difference between the first and second inputs and to selectively provide either a first value or a second value to the output depending on the value of said difference, the logic circuit being further structured and arranged to produce a pulse control signal;

means for providing a desired control signal to the first input;

means for providing a previous control signal to the second input;

a controller structured and arranged to provide a normal control signal;

a switch receiving the normal control signal and the pulse control signal and having a switch output, the switch being responsive to the logic circuit output and providing the pulse control signal to the switch output responsive to the first value on the logic circuit output and providing the normal control signal to the switch output responsive to the second value on the logic circuit output; and an actuator connected to the switch output, the actuator operable to adjust a variable-geometry mechanism of the turbocharger.

12. A control system for controlling a variable-geometry mechanism in a turbocharger for an engine, comprising:

a logic arrangement structured and arranged to sample a desired control value representing a desired operating condition in which the turbocharger is to be operated, and to sample a previous desired control value representing the desired control value determined in a previous sample period, the logic arrangement being further structured and arranged to determine a first difference parameter as the difference between the desired control value and the previous desired control value and to produce a control signal output based on said first difference parameter, such that the control signal output has a first value when said first difference parameter is greater than a predetermined first threshold and has a second value different from the first value when said first difference parameter is not greater than the predetermined first threshold, and wherein the logic arrangement is structured and arranged to provide the first value as a pulse of predetermined amplitude and duration.

13. The control system of claim 12, wherein the logic arrangement is structured and arranged to determine the amplitude and duration of the pulse as a function of said first difference parameter.

14. The control system of claim 13, wherein the logic arrangement is structured and arranged to cause the control signal output to have the second value upon expiration of the duration of the pulse.

15. The control system of claim 12, wherein the logic arrangement is structured and arranged to determine the amplitude and duration of the pulse as a function of ambient conditions.

16. The control system of claim 12, wherein the logic arrangement includes a switch structured and arranged to switch between first and second conditions, the switch in the first condition outputting the control signal output having the first value, the switch in the second condition outputting the control signal output having the second value, the logic arrangement being structured and arranged to provide a switching signal to the switch for switching between the first and second conditions.

17. The control system of claim 16, wherein the second value for the control signal output comprises a normal control signal, and further comprising a controller structured and arranged to produce the normal control signal for driving the turbocharger from a current operating condition toward the desired operating condition.

18. The control system of claim 17, wherein the controller comprises an open-loop controller.

19. The control system of claim 18, wherein the open-loop controller is structured and arranged to produce the normal control signal as a function of engine speed and degree of loading on the engine.

20. The control system of claim 18, wherein the open-loop controller is structured and arranged to produce the normal control signal as a function of engine speed and fueling rate of the engine.

21. The control system of claim 17, wherein the controller comprises a closed-loop controller receiving a feedback signal and determining the normal control signal based on the feedback signal.

22. The control system of claim 21, wherein the logic arrangement is structured and arranged to sample an actual control value representing an actual operating condition of the turbocharger and to determine a second difference parameter as the difference between the desired control value and the actual control value, the logic arrangement producing the control signal output at the first value when either the first difference parameter is greater than the first threshold or the second difference parameter is greater than the second threshold.

23. The control system of claim 22, further comprising a sensor operable to detect the actual operating condition and to produce the actual control value and supply the actual control value to the logic arrangement.

24. The control system of claim 12, further comprising a memory structured and arranged to store the previous desired control value and to supply the previous desired control value to the logic arrangement.

25. The control system of claim 24, wherein the memory is structured and arranged to filter the stored previous desired control value.

26. The control system of claim 12, further comprising an actuator operable to adjust the variable-geometry mechanism, the actuator being arranged to receive the control signal output from the logic arrangement.

* * * * *